(12) United States Patent
Amel et al.

(10) Patent No.: US 10,952,250 B2
(45) Date of Patent: Mar. 16, 2021

(54) RECEIVER AND A METHOD FOR DETECTING CHANNEL OCCUPANCY OF A RADIO CHANNEL

(71) Applicant: Intel IP Corporation, Santa Clara, CA (US)

(72) Inventors: Roy Amel, Binyamina (IL); Shahar Gross, Nes-Tziona (IL); Ofer Benjamin, Petach-Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/474,565

(22) PCT Filed: Feb. 7, 2017

(86) PCT No.: PCT/IB2017/050647
§ 371 (c)(1),
(2) Date: Jun. 28, 2019

(87) PCT Pub. No.: WO2018/146512
PCT Pub. Date: Aug. 16, 2018

(65) Prior Publication Data
US 2019/0349993 A1    Nov. 14, 2019

(51) Int. Cl.
*H04W 74/08* (2009.01)
*H04B 1/16* (2006.01)

(52) U.S. Cl.
CPC .......... *H04W 74/0808* (2013.01); *H04B 1/16* (2013.01)

(58) Field of Classification Search
CPC .................................................... H04B 17/318
See application file for complete search history.

(56) References Cited

U.S. PATENT DOCUMENTS

| | | | |
|---|---|---|---|
| 10,299,290 B2 | 5/2019 | Amel et al. | |
| 2006/0139499 A1* | 6/2006 | Onomatsu | H04N 21/6112 348/725 |
| 2009/0273505 A1 | 11/2009 | Pearson et al. | |
| 2012/0313680 A1* | 12/2012 | Kodama | H04B 1/1027 327/157 |
| 2015/0110012 A1 | 4/2015 | Bhushan et al. | |
| 2016/0174214 A1 | 6/2016 | Yerramalli et al. | |
| 2016/0183303 A1 | 6/2016 | Flammer, III | |
| 2016/0234841 A1 | 8/2016 | Pao et al. | |

* cited by examiner

*Primary Examiner* — Kevin Kim
(74) *Attorney, Agent, or Firm* — 2SPL Patent Attorneys PartG mbB; Kieran O'Leary

(57) ABSTRACT

A receiver for detecting channel occupancy of a radio channel is provided. The receiver includes an oscillation circuit configured to generate an oscillation signal. The oscillation circuit is configured to alternate a frequency of the oscillation signal between at least two different frequency values. Further, the receiver includes a down-conversion circuit configured to generate, based on a received radio frequency signal and the oscillation signal, one of an in-phase component and a quadrature component of a baseband signal. The receiver additionally includes a processing circuit configured to calculate, based on the in-phase component or the quadrature component, a signal power of the radio frequency signal.

21 Claims, 4 Drawing Sheets

RECEIVER AND A METHOD FOR DETECTING CHANNEL OCCUPANCY OF A RADIO CHANNEL

FIELD

Exemplary implementations relate to detection of channel occupancy. In particular, examples relate to a receiver and a method for detecting channel occupancy of a radio channel.

BACKGROUND

The unlicensed 5 GHz band is shared among radio communication devices and radar devices. In the 5 GHz band, Dynamic Frequency Selection (DFS) is mandatory for radio communication. The use of DFS-channels is permissible when there is minimal or no interference with radar signals. The regulations define two types of entities: master and slave. A master device must include radar detection capabilities. Such a device is required to comply with a set of detection abilities before it is granted to use a DFS-channel.

The regulatory requirement for the master device is to "listen" to a radio channel for a consequent minute in order to make a decision on the presence of radar signals in the radio channel. Only when no radar signals are detected, the transmission on a DFS-channel is allowed. Hence, battery-fed (mobile) devices may require very low power radar detection capabilities, which enables them to be "always-ON" (e.g. perform detection 100% of the time). Such an "always-ON" detection capabilities may allow a user to start an ad-hoc activity on a DFS-channel instantly (i.e. without the need to wait for one minute).

Hence, there may be a desire for a channel occupancy detection technique.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
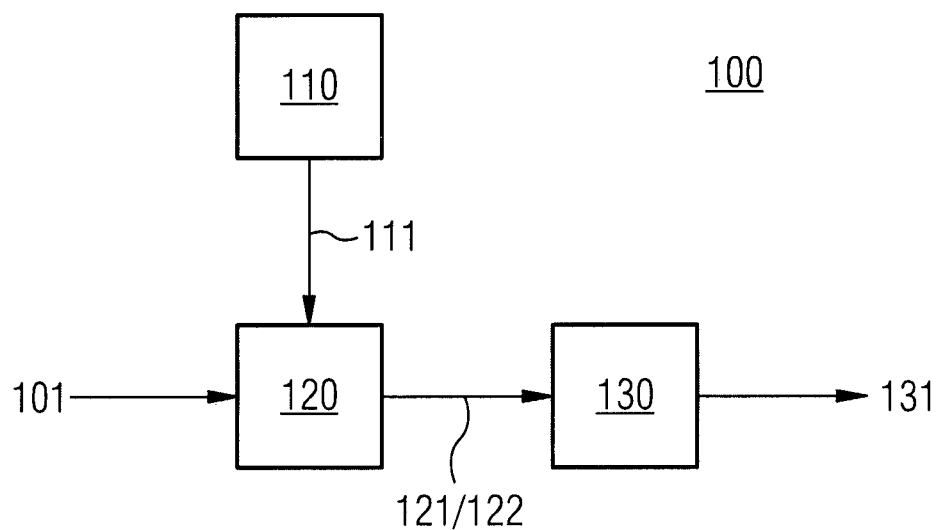
FIG. 1 illustrates an example of a receiver for detecting channel occupancy of a radio channel.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), LTE or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates a receiver 100 for detecting channel occupancy of a radio channel. The receiver 100 comprises an oscillation circuit 110 configured to generate an oscillation signal 111. The oscillation circuit 110 is further configured to alternate a frequency of the oscillation signal 111 between at least two different frequency values. Further, the receiver 100 comprises a down-conversion circuit 120 configured to generate, based on a received radio frequency signal 101 and the oscillation signal 111, one of an in-phase (I) component 121 and a quadrature (Q) component 122 of a baseband signal. The receiver 100 additionally comprises a processing circuit 130 configured to calculate, based on the in-phase component 121 or the quadrature component 122, a signal power 131 of the radio frequency signal 101.

The receiver 100 may allow detection of channel occupancy of the radio channel with reduced power since only one of the in-phase component 121 and the quadrature component 122 of the baseband signal is generated and evaluated. Moreover, the receiver 100 may allow detection of signals in the radio channel which are orthogonal to the oscillation signal 111 for one of the oscillation signal's frequency values. For example, if the signal in the radio channel is orthogonal to the oscillation signal 111 for a first frequency value of the oscillation signal 111, it is no longer orthogonal to the oscillation signal 111 for a second frequency value of the oscillation signal 111. Due to alternating the frequency of the oscillation signal 111 between the at least two different frequency values, the signal in the radio channel is not "invisible" for the receiver 100.

The radio channel is a frequency or frequency band for transmitting electromagnetic waves. For example, the bandwidth of the radio channel may be at least 500 kHz, 1 MHz, 5 MHz, 10 MHz, 20 MHz, 40 MHz, or 80 MHz. A frequency of the radio channel may, e.g., be between 4.9 GHz and 6 GHz or between 2.4 GHz and 2.5 GHz. However, the receiver 100 is not limited to the above frequency ranges or bandwidths. The receiver 100 may be used to detect channel occupancy of any radio channel. In some examples, the at least two different frequency values of the oscillation signal 111 are within a frequency band of the radio channel.

The oscillation circuit 110 may, e.g., alternate the frequency of the oscillation signal 111 at least 100 times per second, 500 times per second, 1000 times per second, 2500 times per second, 5000 times per second, or 10000 times per second. For example, the oscillation circuit 110 may first generate the oscillation signal 111 with a first frequency value for 0.1 milliseconds (ms), 0.5 ms, 1 ms, 2 ms, 5 ms, 10 ms, or more and then generate the oscillation signal 111 with a different second frequency value for 0.1 ms, 0.5 ms, 1 ms, 2 ms, 5 ms, 10 ms, or more. The oscillation circuit 110 may, e.g., alternate the frequency of the oscillation signal 111 between at least two, three, five, ten, or more different frequency values. The oscillation circuit 110 may, in some examples, generate the oscillation signal 111 with a first frequency value for a first period of time and generate the oscillation signal 111 with a different second frequency value for a different second period of time.

The at least two different frequency values may differ by, e.g., at least 100 kHz, 200 kHz, 500 kHz, 1 MHz, 2 MHz, 5 MHz, 10 MHz, or 20 MHz. If the oscillation circuit 110 alternates the frequency of the oscillation signal between more than two different frequency values, the individual frequency values may be separated by equal frequency offsets, or by different frequency offsets.

In some examples, a number of alternations between the at least two different frequency values during a predefined time interval may be based on an expected source of the radio frequency signal 101. This may allow to tune the oscillation signal 111 to expected signal characteristics in the radio channel. This may allow to improve accuracy of the channel occupation detection.

For example, the expected source of the radio frequency signal 101 may be a radar device. Radar signals have known characteristics like pulse length, minimum time between two consecutive pulses, maximum time between two consecutive pulse, etc. Adapting the number of alternations between the at least two different frequency values based on the these known characteristics of radar signals may one the hand allow to improve the detection of radar signals in the radio channel, and on the other hand allow to fulfill regulatory requirements (e.g. established by the European Telecommunications Standards Institute, ETSI, or the Federal Communications Commission, FCC).

For example, the processing circuit 130 may be configured to determine that the radio channel is occupied when the signal power of the radio frequency signal 101 is at or above a predetermined set of values (e.g. a threshold value) for one of the at least two different frequency values. In some examples, the processing circuit 130 may, based on the in-phase component 121 or the quadrature component 122 of the baseband signal, calculate the signal power of the radio frequency signal 101 for each of the at least two different frequency values, and compare it to the threshold value. Accordingly, channel occupancy may be detected also for radio frequency signals 101 that are orthogonal to the oscillation signal 111 for one of its frequency values.

In some examples, the oscillation circuit 110 may comprise a phase-locked loop comprising a controlled oscillator (not illustrated). Further, the oscillation signal 111 may be based on the output signal of the controlled oscillator (e.g. the oscillation signal 111 may be equal to the output signal, or the oscillation signal 111 may be derived from the output signal). The controlled oscillator may be configured to alternate a frequency of its output signal between the frequency of the received radio frequency signal 101 and at least one different frequency value. For example, the controlled oscillator may be a voltage controlled oscillator (VCO), or a digitally controlled oscillator (DCO).

Since only one of the in-phase component 121 and the quadrature component 122 of the baseband signal is generated, there is no need to generate the entire I+Q quadrature at the synthesizer (phase-locked loop). Therefore, the VCO may be an "on frequency" one (i.e. VCO frequency=frequency of oscillation signal 111). This may reduce the power consumption of the phase-locked loop.

Figure 2:
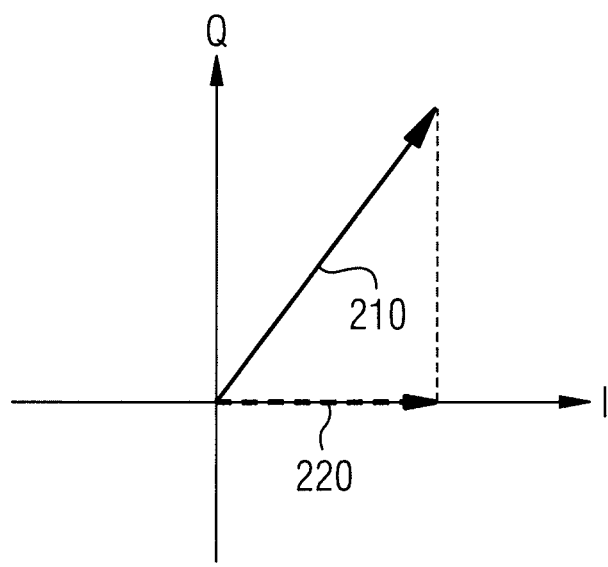
FIG. 2 illustrates an example of a projection of a baseband vector on an in-phase axis.

The receiver 100 allows a significant reduction of power consumption (e.g. about 50%) since an "I only" or "Q only" method is used instead of a conventional I+Q method. As illustrated in FIG. 2, the baseband signal (represented by baseband vector 210) is projected only on either the I-axis (sine axis), or the Q-axis (cosine axis). Hence, only the projected vector 220 of the baseband vector 210 is further analyzed (for detecting energy).

The receiver 100 may, e.g., be used for radar detection in the 5 GHz band. Using the "I only" or "Q only" method (i.e. generating and analyzing only the in-phase component or the quadrature component of the baseband signal) has the effect that although the received data contains complex information, the receiver gets only the real or the imaginary component. A near DC radar signal (i.e. radar signal which is close to 0 MHz in the baseband) may be orthogonal to the oscillation signal (down conversion signal) 111, so that it may be "invisible" for the receiver. However, the receiver 100 may solve this problem by frequency jumping of the oscillation signal 111. Accordingly, if a signal is near DC at a certain time, it is far from DC after the frequency jump.

In both analog/radio frequency domain and digital domain, most of a receiver's power consumption is used for the baseband circuits and for frequency generation. For example, for active analog baseband stages (e.g. transimpedance amplifiers), analog-to-digital converter (ADC) circuits, digital content (e.g. digital front-ends), or synthesizers (e.g. phase-locked loop or VCO). Moreover, baseband circuits may be required to support momentary scans of 80 MHz radio frequency bandwidth (i.e. 40 MHz baseband bandwidth), which may increase the power consumption. The receiver 100 with its "I only" or "Q only" method for radar detection may avoid the above invisibility problem of this architecture (i.e. the ability to detect near DC radars, which may be orthogonal to the down conversion oscillation signal—resulting in the required signal to appear as "invisible") and allow for a low power radar detection. Hence, the receiver 100 may be operated "always on" (e.g. perform radar detection 100% of the time). This may allow zero stall DFS-channel detection.

The receiver 100 may further allow radar detection that complies with the (tough) regulatory detection requirements, such as: the number of minimum radar pulses guaranteed, the minimum time between two pulses, the maximum time between two pulses, or the length of each pulse.

Generally speaking, some examples relate to a means for detecting channel occupancy of a radio channel. The means comprises a means for generating an oscillation signal. The means for generating the oscillation signal is configured to alternate a frequency of the oscillation signal between at least two different frequency values. Further, the means comprises a means for generating, based on a received radio frequency signal and the oscillation signal, one of an in-phase component and a quadrature component of a baseband signal. The means additionally comprises a means for calculating, based on the in-phase component or the quadrature component, a signal power of the radio frequency signal.

In some examples, the means for calculating may be configured to determine that the radio channel is occupied if the signal power of the radio frequency signal is above a threshold value for one of the at least two different frequency values.

The means for detecting channel occupancy of a radio channel may be implemented by a receiver for detecting channel occupancy of a radio channel described above or below (e.g. FIG. 1). The means for generating the oscillation signal may be implemented by an oscillation circuit described above or below (e.g. FIG. 1). The means for generating one of the in-phase component and the quadrature component may be implemented by a down-conversion circuit described above or below (e.g. FIG. 1). The means for calculating the signal power of the radio frequency signal may be implemented by a processing circuit described above or below (e.g. FIG. 1).

Figure 3:
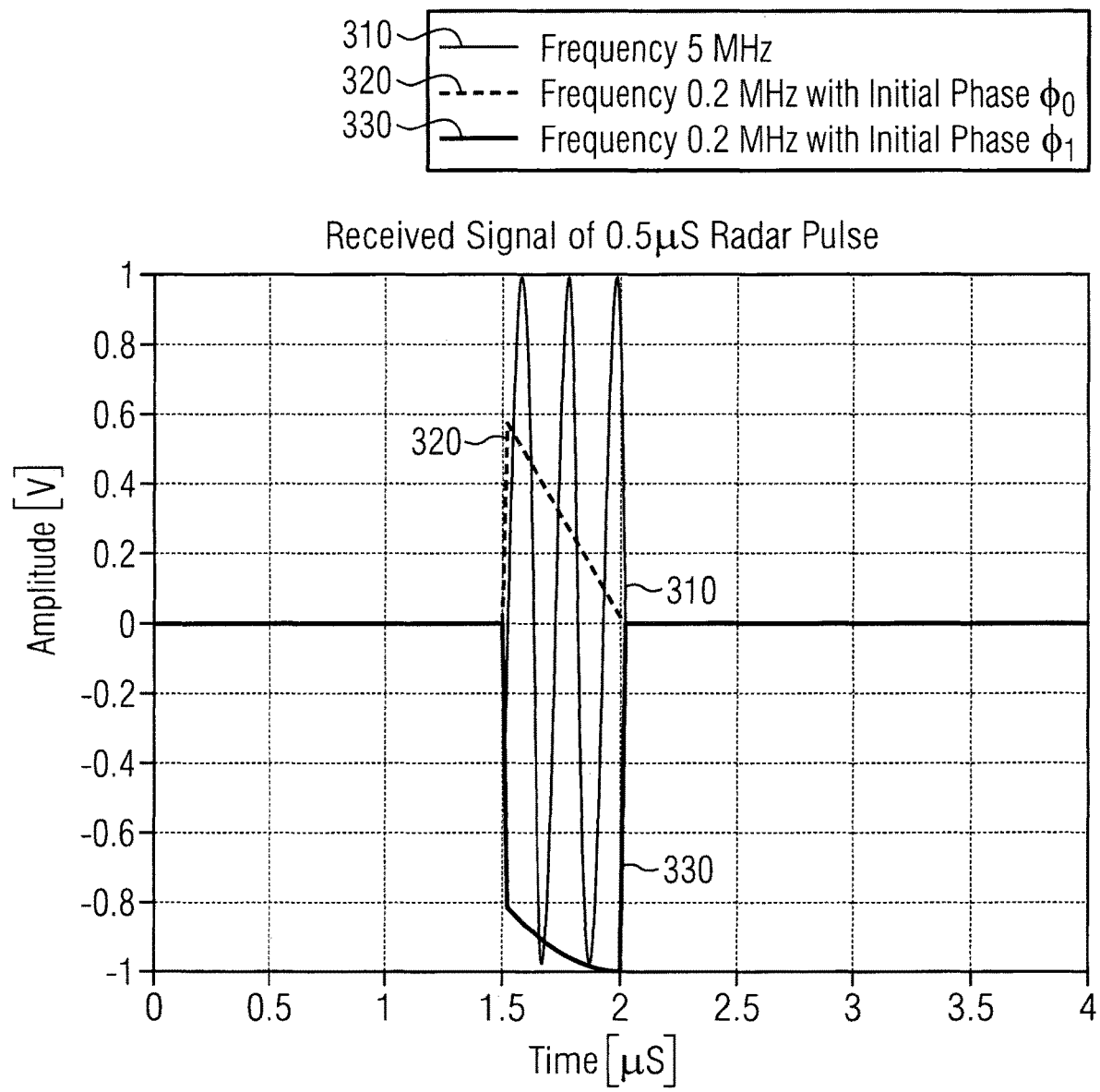
FIG. 3 illustrates examples of amplitudes of a detected radio frequency signal.

FIG. 3 illustrates examples of amplitudes of a detected radar signal. In FIG. 3, the amplitude of the baseband's in-phase component ("I only" projection, sine projection) is illustrated.

Line 320 illustrates a situation in which the oscillation signal for down-mixing the received radio frequency signal (e.g. a radar signal) and the received radio frequency signal are frequency offset by 200 kHz. The oscillation signal has an initial phase $\phi_0$.

Line 330 illustrates a similar situation in which the oscillation signal for down-mixing the received radio frequency signal and the received radio frequency signal are frequency offset by 200 kHz. The oscillation signal has a different initial phase $\phi_1$.

Although the frequency offset of the oscillation signal to the received radio frequency signal is equal, the amplitudes represented by lines 320 and 330 are completely different.

It is evident from FIG. 3 that if the oscillation signal and the frequency of the radio frequency signal is the same or very close, the estimation (determination) of the amplitude is dependent on the initial phase of the oscillation signal (e.g. a sine signal).

Line 330 illustrates a similar situation in which the frequency of the oscillation signal is changed by 5 MHz. In line 330, individual pulses of the received radio frequency signal are visible.

It is evident from FIG. 3 that implementing a frequency jump (e.g. by 5 MHz) may ensure that the amplitude estimation reveals the real shape of the received radio frequency signal. For example, implementing a frequency jump may allow to reveal the real shape of a received radar signal.

Figure 4:
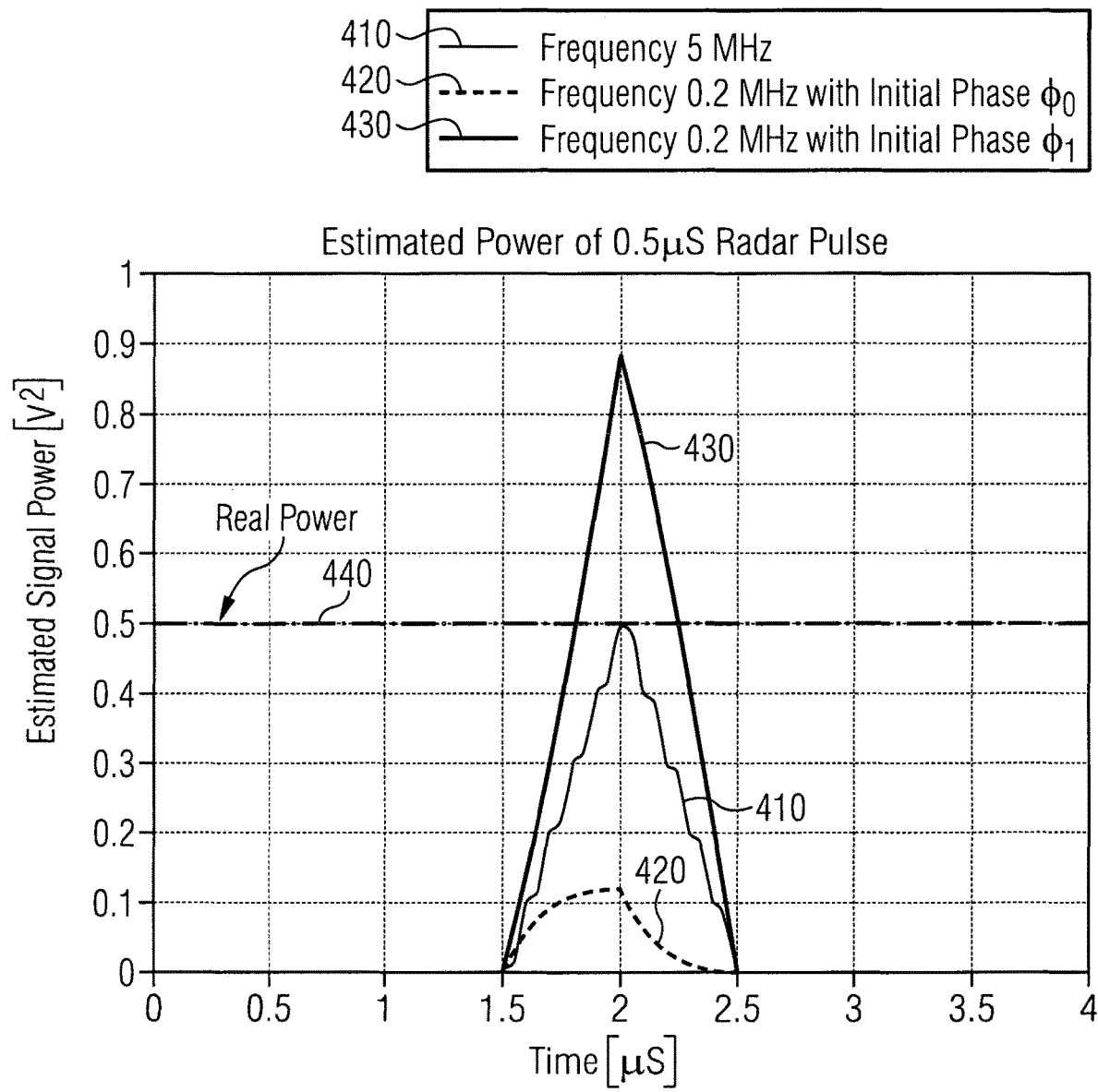
FIG. 4 illustrates examples of powers of a detected frequency signal.

The influence on the calculation of the received radio frequency signal's power is illustrated in FIG. 4. FIG. 4 illustrates examples of calculated powers of a detected radio frequency signal.

In FIG. 4, the same situations as in FIG. 3 are illustrated. Line 420 illustrates a situation in which the oscillation signal for down-mixing the received radio frequency signal (e.g. a radar signal) and the received radio frequency signal are frequency offset by 200 kHz. The oscillation signal has an initial phase $\phi_0$. Line 430 illustrates a similar situation in which the oscillation signal for down-mixing the received radio frequency signal and the received radio frequency signal are frequency offset by 200 kHz. The oscillation signal has a different initial phase $\phi_1$. Line 410 illustrates a similar situation in which the frequency of the oscillation signal is changed by 5 MHz.

As a comparison, the real power of the received radio frequency signal is illustrated by line 440.

Again, if the oscillation signal and the frequency of the radio frequency signal is the same or very close, the estimation (determination) of the signal power is dependent on the initial phase of the oscillation signal (e.g. a sine signal). Only line 410 indicates the correct signal power of the received radio frequency signal. Hence, implementing a frequency jump (e.g. by 5 MHz) may ensure that the power estimation reveals the power of the radio frequency signal.

For example, if the radio frequency signal is a radar signal, the frequency jump may ensure that the power estimation reveals the radar power.

Figure 5:
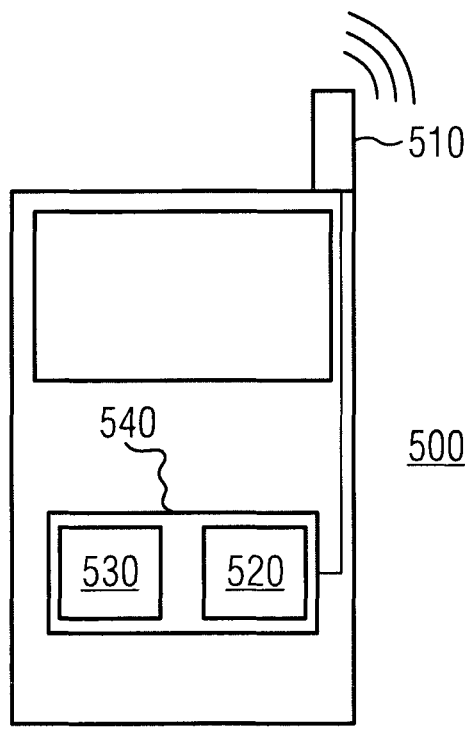
FIG. 5 illustrates an example of a mobile device comprising a receiver for detecting channel occupancy of a radio channel.

An example of an implementation using a receiver for detecting channel occupancy of a radio channel according to one or more aspects of the proposed concept or one or more examples described above is illustrated in FIG. 5. FIG. 5 schematically illustrates an example of a mobile device 500 (e.g. mobile phone, smartphone, tablet-computer, or laptop) comprising a receiver 520 for detecting channel occupancy of a radio channel according to an example described herein. To this end, mobile device may be provided enabling "always-ON" detection capabilities. This may allow usage of DFS-channels without stalling.

In some example, the mobile device 500 may further comprise a transmitter 530 configured to transmit data via the radio channel, if the radio channel is not occupied. Occupation of the radio channel may be detected by the receiver 520. For example, the transmitter 530 may be configured to transmit the data according to the standard IEEE 802.11 of the Institute of Electrical and Electronics Engineers. Hence, the mobile device 500 may allow WLAN transmission on DFS-channels.

As indicated in FIG. 5, a transceiver 540 may comprise the receiver 520 and optionally the transmitter 530.

An antenna element 510 of the mobile device 500 may be coupled to the receiver 520, the transmitter 530, or the transceiver 540.

Figure 6:
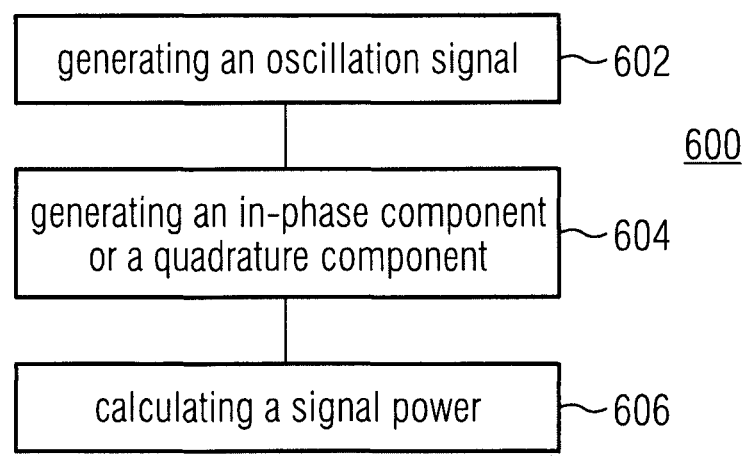
FIG. 6 illustrates a flowchart of an example of a method for detecting channel occupancy of a radio channel.

An example of a method 600 for detecting channel occupancy of a radio channel is illustrated by means of a flowchart in FIG. 6. The method 600 comprises generating 602 an oscillation signal using an oscillation circuit, wherein a frequency of the oscillation signal is to alternate between at least two different frequency values. Further, the method 600 comprises generating 604, based on a received radio frequency signal and the oscillation signal, one of an in-phase component and a quadrature component of a baseband signal using a down-conversion circuit. The method 600 additionally comprises calculating 606, based on the in-phase component or the quadrature component, a signal power of the radio frequency signal using a processing circuit.

More details and aspects of the method are mentioned in connection with the proposed concept or one or more examples described above (e.g. FIGS. 1-5). The method may comprise one or more additional optional features corresponding to one or more aspects of the proposed concept or one or more examples described above.

The proposed concept may allow for a significant power reduction of a radar detection module and, hence, enable an "always on" receiver. This may enable a zero stall DFS detection, i.e., a user may be able to use a DFS-channel without stalling.

As far as communication standards are referred to within the present disclosure, it is referred to the version of the respective communication standard that is valid at the date of filling.

The examples as described herein may be summarized as follows:

Example 1 is a receiver for detecting channel occupancy of a radio channel, comprising: an oscillation circuit configured to generate an oscillation signal, wherein the oscillation circuit is further configured to alternate a frequency of the oscillation signal between at least two different frequency values; a down-conversion circuit configured to generate, based on a received radio frequency signal and the oscillation signal, one of an in-phase component and a quadrature component of a baseband signal; and a processing circuit configured to calculate, based on the in-phase component or the quadrature component, a signal power of the radio frequency signal.

In example 2, the processing circuit in the receiver of example 1 is further configured to determine that the radio channel is occupied when the signal power of the radio frequency signal is at or above a predetermined set of values for one of the at least two different frequency values.

In example 3, the at least two different frequency values of the oscillation signal in the receiver of example 1 or example 2 are within a frequency band of the radio channel.

In example 4, a number of alternations between the at least two different frequency values during a predefined time interval is based on an expected source of the radio frequency signal in the receiver of any of the preceding examples.

In example 5, the expected source of the radio frequency signal in the receiver of example 4 is a radar device.

In example 6, the oscillation circuit in the receiver of any of the preceding examples comprises: a phase-locked loop comprising a controlled oscillator, wherein the controlled oscillator is configured to alternate a frequency of its output signal between the frequency of the received radio frequency signal and at least one different frequency value, and wherein the oscillation signal is based on the output signal of the controlled oscillator.

In example 7, a frequency of the radio channel is between 4.9 GHz and 6 GHz in the receiver of any of the preceding examples.

Example 8 is a transceiver comprising a receiver according to any of examples 1 to 7, and a transmitter.

In example 9, the transmitter in the transceiver of example 8 is configured to transmit data via the radio channel, if the radio channel is not occupied.

In example 10, the transmitter in the transceiver of example 9 is further configured to transmit the data according to the standard IEEE 802.11 of the Institute of Electrical and Electronics Engineers.

Example 11 is a mobile device comprising a receiver according to any of examples 1 to 7.

In example 12, the mobile device of example 11 further comprises: a transmitter configured to transmit data via the radio channel, if the radio channel is not occupied.

In example 13, the transmitter in the mobile device of example 12 is further configured to transmit the data according to the standard IEEE 802.11 of the Institute of Electrical and Electronics Engineers.

Example 14 is a means for detecting channel occupancy of a radio channel, comprising: a means for generating an oscillation signal, wherein the means for generating the oscillation signal is configured to alternate a frequency of the oscillation signal between at least two different frequency values; a means for generating, based on a received radio frequency signal and the oscillation signal, one of an in-phase component and a quadrature component of a baseband signal; and a means for calculating, based on the in-phase component or the quadrature component, a signal power of the radio frequency signal.

In example 15, the means for calculating in the means of example 14 is further configured to determine that the radio channel is occupied if the signal power of the radio frequency signal is above a threshold value for one of the at least two different frequency values.

Example 16 is a method for detecting channel occupancy of a radio channel, comprising: generating an oscillation signal using an oscillation circuit, wherein a frequency of the oscillation signal is to alternate between at least two different frequency values; generating, based on a received radio frequency signal and the oscillation signal, one of an in-phase component and a quadrature component of a baseband signal using a down-conversion circuit; and calculating, based on the in-phase component or the quadrature component, a signal power of the radio frequency signal using a processing circuit.

In example 17, the method of example 16 further comprises: determining, using the processing circuit, that the radio channel is occupied when the signal power of the radio frequency signal is at or above a predetermined set of values for one of the at least two different frequency values.

In example 18, the at least two different frequency values in the method of example 16 or example 17 are within a frequency band of the radio channel.

In example 19, a number of alternations between the at least two different frequency values during a predefined time interval is based on an expected source of the radio frequency signal in the method of any of the preceding examples.

In example 20, the expected source of the radio frequency signal in the method of example 19 is a radar device.

In example 21, a frequency of the radio channel is between 4.9 GHz and 6 GHz in the method of any of the preceding examples.

In example 22, the method of any of the preceding examples further comprises: transmitting data via the radio channel, if the radio channel is not occupied.

In example 23, the data are transmitted according to the standard IEEE 802.11 of the Institute of Electrical and Electronics Engineers in the method of example 22.

Example 24 is one or more non-transitory computer-readable media storing processor-executable instructions that when executed cause a processor to perform the method of any of examples 16 to 23.

Example 25 is a computer program having a program code configured to perform the method of any of examples 16 to 23, when the computer program is executed on a computer or processor.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may further be or relate to one or more non-transitory computer-readable media storing processor-executable instructions that when executed cause a processor to perform one or more of the above methods. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A receiver for detecting channel occupancy of a radio channel, comprising:
   an oscillation circuit configured to generate an oscillation signal, wherein the oscillation circuit is further configured to alternate a frequency of the oscillation signal between at least two different frequency values;
   a down-conversion circuit configured to generate, based on a received radio frequency signal and the oscillation signal, one of an in-phase component and a quadrature component of a baseband signal; and
   a processing circuit configured to calculate, based on the in-phase component or the quadrature component, a signal power of the radio frequency signal.

2. The receiver of claim 1, wherein the processing circuit is further configured to determine that the radio channel is occupied when the signal power of the radio frequency signal is at or above a predetermined set of values for one of the at least two different frequency values.

3. The receiver of claim 1, wherein the at least two different frequency values of the oscillation signal are within a frequency band of the radio channel.

4. The receiver of claim 1, wherein a number of alternations between the at least two different frequency values during a predefined time interval is based on an expected source of the radio frequency signal.

5. The receiver of claim 4, wherein the expected source of the radio frequency signal is a radar device.

6. The receiver of claim 1, wherein the oscillation circuit comprises:
   a phase-locked loop comprising a controlled oscillator, wherein the controlled oscillator is configured to alternate a frequency of its output signal between the frequency of the received radio frequency signal and at least one different frequency value, and wherein the oscillation signal is based on the output signal of the controlled oscillator.

7. The receiver of claim 1, wherein a frequency of the radio channel is between 4.9 GHz and 6 GHz.

8. A transceiver comprising a receiver according to claim 1 and a transmitter.

9. The transceiver of claim 8, wherein the transmitter is configured to transmit data via the radio channel, if the radio channel is not occupied.

10. The transceiver of claim 9, wherein the transmitter is further configured to transmit the data according to the standard IEEE 802.11 of the Institute of Electrical and Electronics Engineers.

11. A mobile device comprising a receiver according to claim 1.

12. The mobile device of claim 11, further comprising:
    a transmitter configured to transmit data via the radio channel, if the radio channel is not occupied.

13. The mobile device of claim 12, wherein the transmitter is further configured to transmit the data according to the standard IEEE 802.11 of the Institute of Electrical and Electronics Engineers.

14. A method for detecting channel occupancy of a radio channel, comprising:
    generating an oscillation signal using an oscillation circuit, wherein a frequency of the oscillation signal is to alternate between at least two different frequency values;
    generating, based on a received radio frequency signal and the oscillation signal, one of an in-phase component and a quadrature component of a baseband signal using a down-conversion circuit; and
    calculating, based on the in-phase component or the quadrature component, a signal power of the radio frequency signal using a processing circuit.

15. The method of claim 14, further comprising:
    determining, using the processing circuit, that the radio channel is occupied when the signal power of the radio frequency signal is at or above a predetermined set of values for one of the at least two different frequency values.

16. The method of claim 14, wherein the at least two different frequency values are within a frequency band of the radio channel.

17. The method of claim 14, wherein a number of alternations between the at least two different frequency values during a predefined time interval is based on an expected source of the radio frequency signal.

18. The method of claim 17, wherein the expected source of the radio frequency signal is a radar device.

19. The method of claim 14, wherein a frequency of the radio channel is between 4.9 GHz and 6 GHz.

20. The method of claim 14, further comprising:
transmitting data via the radio channel, if the radio channel is not occupied.

21. The method of claim 20, wherein the data are transmitted according to the standard IEEE 802.11 of the Institute of Electrical and Electronics Engineers.

* * * * *